UNITED STATES PATENT OFFICE.

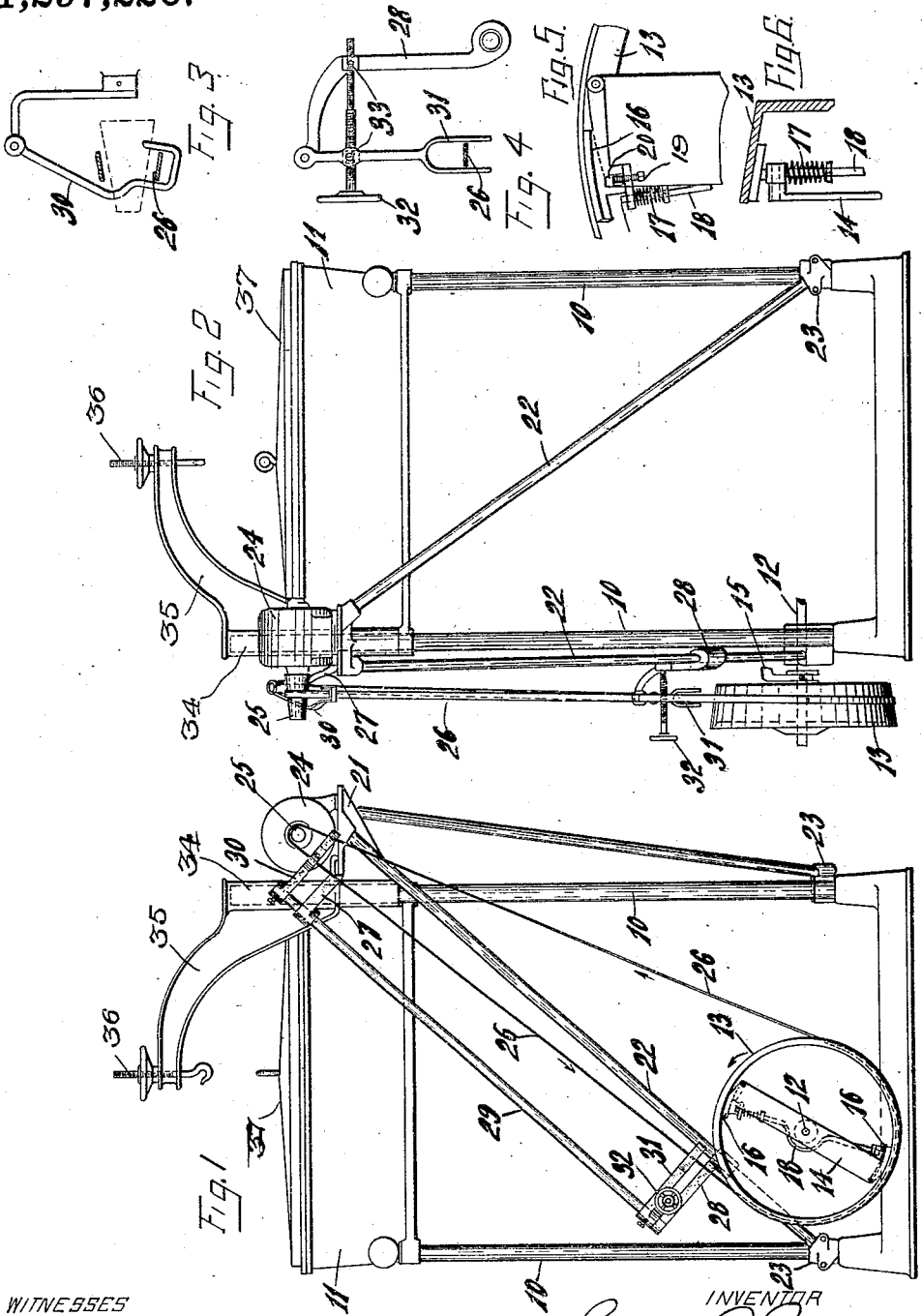

GEORGE J. MEYER, OF MILWAUKEE, WISCONSIN.

VARIABLE-SPEED DRIVE.

1,297,220.  Specification of Letters Patent.  Patented Mar. 11, 1919.

Application filed November 22, 1915. Serial No. 62,707.

*To all whom it may concern:*

Be it known that I, GEORGE J. MEYER, a citizen of the United States, and resident of Milwaukee, in the county of Milwaukee and State of Wisconsin, have invented new and useful Improvements in Variable-Speed Drives, of which the following is a description, reference being had to the accompanying drawings, which are a part of this specification.

This invention has for its object to provide a variable speed drive mechanism for bottle filling machines and the like whereby the speed of operation of the machine may be nicely adjusted to correspond with the speed at which the bottles are fed thereto.

Another object of this invention is to provide such a variable speed drive mechanism adapted for attachment to bottle filling machines at present in use.

With the above and other objects in view the invention consists in the variable speed drive as herein claimed and all equivalents.

Referring to the accompanying drawings, in which like characters of reference indicate the same parts in the different views, Figure 1 is a rear view of a bottle filling machine provided with the variable speed drive mechanism of this invention;

Fig. 2 is a side view thereof;

Fig. 3 is a detail view showing the upper belt hook;

Fig. 4 is a similar view showing the lower belt hook and the adjusting means;

Fig. 5 is a detail view of a clutch construction; and,

Fig. 6 is a sectional view at right angles thereto.

In these drawings 10 indicates the corner uprights of the frame of a bottle filling machine 11, and 12 is the driving shaft of said bottle filling machine which is to be driven at a variable speed by the mechanism constituting this invention. A large conical drive wheel 13 is loosely mounted on the shaft 12 and is adapted to be clutched thereto by means of a clutch member 14 splined on the shaft 12 so as to slide under the influence of a suitably operated clutch yoke 15. Said clutch member 14 carries at its opposite ends a pair of pivotally mounted spring pressed clutch shoes 16 to engage the inner surface of the flaring rim of the drive wheel 13. The clutch shoes 16 are pressed outwardly by means of a spring 17 surrounding a rod 18 which is slidably mounted on the clutch member 14 and bears at one end against one clutch shoe, while the other end slidably fits in the other clutch shoe, and the spring 17 which bears against a shoulder on said rod 18 presses against said other clutch shoe direct. The spring pressure is thus equalized against the two clutch shoes, but the outward movement of the clutch shoes is limited by the engagement of set screws 19 thereon with stop lugs 20 on the clutch member 14.

A bracket 21 is mounted as a sleeve on one corner post 10 and is connected by diagonal brace rods 22 with clamps 23 on the two adjacent corner posts 10, thus forming a trussed framework supplemental to the frame of the machine and connected thereto. Securely fixed on the bracket 21 is an electric motor 24 whose small driving pulley 25 is conical and complementary to the conical face of the driving pulley 13 which is in the same vertical plane therewith. The motor pulley 25 and the driving pulley 13 are connected by a belt 26 which is much narrower than their faces and is adapted to be shifted over the faces of the pulleys to vary the speed of the shaft 12 relative to the speed of the motor shaft. An arm 27 rigidly secured on the bracket 21, and a corresponding arm 28 rigidly secured on one of the brace rods 22 form fixed bearings for a rock shaft 29 which carries an upper belt hook 30 and a lower belt hook 31. The upper belt hook 30 is bent around the upper length of the belt 26 and engages in its hook shaped end the lower length thereof, as clearly seen in Fig. 3, just before the belt engages the motor pulley 25, while the lower belt hook 31 is forked at its end to embrace the upper length of the belt 26 just before it engages the pulley 13, the parts moving in the direction of the arrows in Fig. 1. The two belt hooks 30 and 31 being adjustably fixed on the rock shaft 29 will move simultaneously when the rock shaft is moved and this is accomplished by means of a hand screw 32 having a right and left hand threaded connection with nuts 33 pivotally mounted on the belt hook 31 and the arm 28 respectively, as best seen in Fig. 4.

In operation the motor 24 drives the shaft 12 of the bottle filling machine or other mechanism when the clutch is engaged, the belt 26 serving to communicate motion from the motor pulley 25 to the driving pulley 13, and the speed at which the shaft 12 is driven will be determined by the position of the belt 26 on the conical faces of the pulleys 25 and 13, as controlled by the adjustment of the hand screw 32. This speed may be varied at will by turning the hand screw 32 to the right or to the left, as the case may be, to simultaneously shift the positions of the belt hooks 30 and 31 so that the belt engages different portions of the conical faces of the pulleys. When the clutch member 14 is thrown to stop the machine, the spring pressed clutch shoes 16 are moved out of engagement with the rim of the conical pulley 13 as their outward movement under spring pressure is limited by engagement of the set screws 19 with the stop lugs 20.

An exact adjustment of the speed of operation of the bottle filling machine is accomplished by means of this invention and the adjustment will be maintained until a change is desired. The simultaneously operated upper and lower belt hooks assure against a stretching of the belt or undue slackness thereof so as to maintain a proper driving connection between the two pulleys in all speed adjustments.

One of the corner uprights 10 continues above the top of the frame of the machine to form an upstanding post on which is loosely mounted a sleeve 34 carrying a davit 35 with an adjustable lifting screw 36 on its end to engage the eye in the center of the cover 37 of the filling tank at the top of the machine. By this means the cover of the tank may be raised and swung to one side without difficulty, and it may also be returned and lowered into place with the same ease, making special mechanism unnecessary for this purpose.

What I claim as new and desire to secure by Letters Patent is:

1. A variable speed drive for bottle filling machines and the like, comprising a driving shaft, a cone-faced pulley thereon, a motor driven cone-faced pulley, a belt connecting the pulleys, suitably mounted supporting brackets a rock shaft journaled therein, belt hooks fixed on the rock shaft and embracing the belt at positions where the belt approaches the pulleys, and a hand screw having engagement with one of the belt hooks and one of the brackets respectively.

2. A variable speed drive for bottle filling machines, comprising corner posts, a drive shaft, a supplemental frame consisting of a bracket adapted for connection with the upper end of one of the corner posts and inclined brace rods connected with the bracket and having clamps at their ends for connection with the lower ends of adjacent corner posts, a cone-faced pulley on the drive shaft, an electric motor on the bracket, a cone-faced pulley driven thereby, a belt connecting the pulleys, arms on the supplemental frame, a shaft loosely mounted in the arms, belt hooks adjustably mounted on the shaft and engaging the belt at points where the belt approaches the pulleys, and a hand screw connected with one of the belt hooks and one of the arms for turning the shaft to shift both belt hooks simultaneously.

In testimony whereof, I affix my signature, in presence of two witnesses.

GEORGE J. MEYER.

Witnesses:
R. S. C. CALDWELL,
KATHERINE HOLT.

Copies of this patent may be obtained for five cents each, by addressing the "Commissioner of Patents, Washington, D. C."